United States Patent
Subbiah et al.

(10) Patent No.: US 12,316,079 B2
(45) Date of Patent: *May 27, 2025

(54) APPARATUS FOR MONITORING A SWITCHGEAR

(71) Applicant: ABB Schweiz AG, Baden (CH)

(72) Inventors: Subanatarajan Subbiah, Neulussheim (DE); Ralf Gitzel, Mannheim (DE); Benedikt Schmidt, Heidelberg (DE)

(73) Assignee: ABB Schweiz AG, Baden (CH)

( * ) Notice: Subject to any disclaimer, the term of this patent is extended or adjusted under 35 U.S.C. 154(b) by 414 days.

This patent is subject to a terminal disclaimer.

(21) Appl. No.: 17/465,882

(22) Filed: Sep. 3, 2021

(65) Prior Publication Data

US 2021/0397837 A1 Dec. 23, 2021

Related U.S. Application Data

(63) Continuation of application No. PCT/EP2020/055435, filed on Mar. 2, 2020.

(30) Foreign Application Priority Data

Mar. 7, 2019 (EP) .................................. 19161429

(51) Int. Cl.
H02B 3/00 (2006.01)
G06F 18/214 (2023.01)
(Continued)

(52) U.S. Cl.
CPC ............ *H02B 3/00* (2013.01); *G06F 18/214* (2023.01); *G06F 18/2433* (2023.01);
(Continued)

(58) Field of Classification Search
CPC ..... H02B 3/00; G06F 18/214; G06F 18/2433; G06F 18/40; G06N 3/045; G06N 3/08;
(Continued)

(56) References Cited

U.S. PATENT DOCUMENTS

| 4,967,276 A | 10/1990 | Murakami et al. |
| 5,519,529 A | 5/1996 | Ahearn et al. |

(Continued)

FOREIGN PATENT DOCUMENTS

| CA | 2180960 A1 | 8/1995 |
| CN | 103411970 A | 11/2013 |

(Continued)

OTHER PUBLICATIONS

"Liao Zhiwei et al., Research on Fault Diagnosis of Switchgear Contacts Based on BP Neural Network, Nov. 2018, 2018 International Conference on Power System Technology Powercon, Guangzhou, China" (Year: 2018).*

(Continued)

*Primary Examiner* — Andrae S Allison
*Assistant Examiner* — Phuong Hau Cai
(74) *Attorney, Agent, or Firm* — Leydig, Voit & Mayer, Ltd.

(57) ABSTRACT

An apparatus for monitoring a switchgear includes: an input unit; a processing unit; and an output unit. The input unit is provides the processing unit with a monitored infra-red image of a switchgear. The processing unit implements a machine learning classifier algorithm to analyse the monitored infra-red image and determine if there is one or more anomalous hot spots in the switchgear. The machine learning classifier algorithm has been trained based on a plurality of different training images, the plurality of training images including a plurality of synthetic infra-red images generated by an image processing algorithm. The output unit outputs information relating to the one or more anomalous hot spots.

21 Claims, 2 Drawing Sheets

(51) Int. Cl.
G06F 18/2433 (2023.01)
G06F 18/40 (2023.01)
G06N 3/045 (2023.01)
G06T 11/00 (2006.01)
G06V 10/764 (2022.01)
G06V 10/82 (2022.01)
G06V 20/10 (2022.01)
H04N 5/33 (2023.01)

(52) U.S. Cl.
CPC ............. *G06F 18/40* (2023.01); *G06N 3/045* (2023.01); *G06T 11/00* (2013.01); *G06V 10/764* (2022.01); *G06V 10/82* (2022.01); *G06V 20/10* (2022.01); *H04N 5/33* (2013.01)

(58) Field of Classification Search
CPC ...... G06T 11/00; G06V 10/764; G06V 10/82; G06V 20/10; H04N 5/33
See application file for complete search history.

(56) References Cited

U.S. PATENT DOCUMENTS

| | | | |
|---|---|---|---|
| 2010/0045809 | A1 | 2/2010 | Packard |
| 2013/0002881 | A1* | 1/2013 | Shim ................. H04N 23/20 348/E5.09 |
| 2015/0248764 | A1 | 9/2015 | Keskin et al. |
| 2018/0307947 | A1 | 10/2018 | Choi et al. |

FOREIGN PATENT DOCUMENTS

| | | |
|---|---|---|
| CN | 103593494 A | 2/2014 |
| CN | 104850047 A | 8/2015 |
| CN | 106803940 A | 6/2017 |
| CN | 107607207 A | 1/2018 |
| CN | 107680195 A | 2/2018 |
| CN | 108564565 A | 9/2018 |
| CN | 109101906 A | 12/2018 |
| CN | 208537031 U | 2/2019 |
| EP | 0342597 A2 | 11/1989 |
| KR | 10-2014-0043976 A | 4/2014 |
| WO | WO 2019/002205 A1 | 1/2019 |
| WO | WO-2019002507 A1 * | 1/2019 ............ B25J 11/005 |

OTHER PUBLICATIONS

"Vladimir V. Kniaz et al., ThermalGAN: Multimodal Color-to-Thermal Image Translation for Person Re-Identification in Multispectral Dataset, 2018, Proceedings of the European Conference on Computer Vision (ECCV) Workshops" (Year: 2018).*

"Cai Lile et al., Anomaly Detection in Thermal Images using Deep Neural Networks, Feb. 2018, 2017 IEEE International Conference on Image Processing ICIP, Beijing China" (Year: 2018).*

"Surbhi Pareek et al., Application of Artificial Neural Networks to Monitor Thermal Condition of Electrical Equipment, Feb. 2018, 2017 3rd International Conference on Condition Assessment Techniques in Electrical Systems Catcon, Rupnagar, India" (Year: 2018).*

"Josey Matthew et al., Classification of Imbalanced Data by Oversampling in Kernel Space of Support Vector Machines, Sep. 2018, IEEE Transactions on Neural Networks and Learning Systems, vol. 29, No. 9" (Year: 2018).*

"Chen-Zhao Fu et al., Research on a Detection and Recognition Algorithm for High-Voltage Switch Cabinet Based on Deep Learning with an Improved YOLOv2 Network, Sep. 2018, 2018 11th International Conference on Intelligent Computation Technology and Automation" (Year: 2018).*

European Patent Office, Extended European Search Report in European Patent Application No. 19161429.6, 8 pp. (Sep. 10, 2019).

European Patent Office, International Preliminary Report on Patentability in International Patent Application No. PCT/EP2020/055435, 8 pp. (Aug. 25, 2021).

European Patent Office, International Search Report in International Patent Application No. PCT/EP2020/055435, 4 pp. (Mar. 26, 2020).

European Patent Office, Written Opinion in International Patent Application No. PCT/EP2020/055435, 7 pp. (Mar. 26, 2020).

Wang et al., "SmartGuard: An Autonomous Robotic System for Inspecting Substation Equipment," *J. Field Robotics*, 29(1): 123-137 (Nov. 16, 2011).

The Patent Office of The People's Republic of China, Office Action in Chinese Patent Application No. 202080018418.9, 17 pp. (Mar. 16, 2024).

The Patent Office of The People's Republic of China, Office Action in Chinese Patent Application No. 202080018418.9, 8 pp. (Jul. 31, 2024).

* cited by examiner

Drawing of the inside of a circuit breaker with a hot spot indicated.

The drawing has been transformed into a synthetic Infrared image to be used for training of the neural network based hot spot detection algorithm.

APPARATUS FOR MONITORING A SWITCHGEAR

CROSS-REFERENCE TO PRIOR APPLICATION

This application is a continuation of International Patent Application No. PCT/EP2020/055435, filed on Mar. 2, 2020, which claims priority to European Patent Application No. EP 19161429.6, filed on Mar. 7, 2019. The entire disclosure of both applications is hereby incorporated by reference herein.

FIELD

The present invention relates to an apparatus and system for monitoring a switchgear.

BACKGROUND

Switchgear failures due to hot spots of high temperatures can have dramatic consequences, for example electric arcs/flash overs that can act almost like explosions. A method and associated system for monitoring and early warning before such incidents develop is highly needed and currently not available in an affordable form, which could be installed as a standard in every switchgear and give enough information on the switchgear health state. Also, no method or system is available where images of a switchgear are acquired and transmitted for processing elsewhere in order to provide such monitoring and early warning. Currently in utilities the measurement of temperature variations is one of the most common measurement indicators of the structural health of equipment and components. Corroded connections, faulty contacts, damaged components etc. can cause hotspots. Currently one common practice is to use infra-red cameras to capture thermal variation images and analyze them manually to find hotspots and then perform a maintenance action. At the moment, using IR sensors to detect hot spots in circuit breakers, switchgear, and other electrical equipment requires a lot of very precise calibration to measure the temperature at exactly the right position. There is also an associated problem of identifying the right region in the IR image to monitor. A common solution for all switchgear and all circuit breakers within such switchgear is not possible because of different types and geometry.

There is a need to address these issues.

SUMMARY

In an embodiment, the present invention provides an apparatus for monitoring a switchgear, the apparatus comprising: an input unit; a processing unit; and an output unit, wherein the input unit is configured to provide the processing unit with a monitored infra-red image of a switchgear, wherein the processing unit is configured to implement a machine learning classifier algorithm to analyse the monitored infra-red image and determine if there is one or more anomalous hot spots in the switchgear, wherein the machine learning classifier algorithm has been trained based on a plurality of different training images, the plurality of training images comprising a plurality of synthetic infra-red images generated by an image processing algorithm, and wherein the output unit is configured to output information relating to the one or more anomalous hot spots.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
FIG. 1 shows a schematic example of the transformation of a sketch into an infra-red image.
Figure 1:
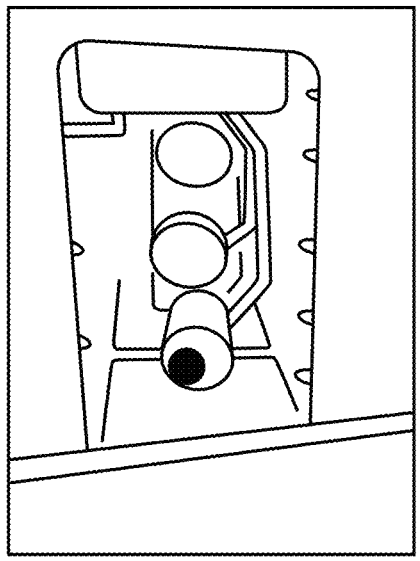

In an embodiment, the present invention provides an improved ability to monitor a switchgear.

In a first aspect, there is provided an apparatus for monitoring a switchgear, the apparatus comprising:

an input unit;
a processing unit; and
an output unit.

The input unit is configured to provide the processing unit with a monitored infra-red image of a switchgear. The processing unit is configured to implement a machine learning classifier algorithm to analyse the monitored infra-red image and determine if there is one or more anomalous hot spots in the switchgear. The machine learning classifier algorithm has been trained on the basis of a plurality of different training images. The plurality of training images comprises a plurality of synthetic infra-red images generated by an image processing algorithm. The output unit is configured to output information relating to the one or more anomalous hot spots.

In this manner, the apparatus can determine if there are hot spots in switchgear and other electrical components more accurately, because a large training set can be generated to improve the ability to determine if there are hot spots over a wider range of situations for different switchgears and without human intervention.

The apparatus is specified with respect to a switchgear, however the apparatus can be used to monitor other electrical equipment that can suffer from hot spots.

Thus, the image processing algorithm can be considered to be acting as a synthetic image generator.

In an example, the image processing algorithm is a Conditional Adversarial Network.

In an example, the plurality of synthetic infra-red images were generated on the basis of at least one computer aided design drawing, drawing, or sketch of a switchgear.

Thus, as discussed above, the drawings etc can also be of other electrical equipment that can suffer from hot spots.

In an example, the at least one computer aided design drawing, drawing, or sketch comprises a plurality of drawings comprising drawing data of a plurality of different switchgear.

In an example, the at least one computer aided design drawing, drawing, or sketch comprises drawing data of at least one circuit breaker.

In an example, the at least one computer aided design drawing, drawing, or sketch comprises a plurality of drawings comprising drawing data of a plurality of circuit breakers having different internal structures.

In an example, two or more of the plurality of synthetic infra-red images were generated on the basis of one computer aided design drawing, drawing, or sketch of a switchgear.

In an example, the plurality of synthetic infra-red images were generated on the basis of a corresponding number of computer aided design drawings, drawings, or sketches of a switchgear.

In an example, generation of one or more synthetic infra-red images of the plurality of synthetic infra-red images comprises an addition of at least one hot spot to the one or more synthetic infra-red images.

In an example, generation of one or more synthetic infra-red images of the plurality of synthetic infra-red images comprises an addition of at least one hot spot to the one or more computer aided design drawing, drawing, or sketch of a switchgear.

In an example, addition of the at least one hot spot is carried out manually.

In an example, the at least one computer aided design drawing, drawing, or sketch of a switchgear comprises drawing data of at least one circuit breaker.

In an example, the image processing algorithm utilizes a style transfer algorithm.

In an example, the image processing algorithm utilizes a pix2pix algorithm.

In an example, the monitored infra-red image comprises image data of at least one circuit breaker.

In an example, the machine learning classifier algorithm is a neural network.

In an example, the neural network is a convolutional neural network.

In an example, the processing unit is configured to update the training of the machine learning classifier algorithm comprising utilisation of the monitored infra-red image.

In an example, the training update comprises a manual indication that the monitored infra-red image comprises no anomalous hot spots or a manual indication that the monitored infra-red image comprises one or more anomalous hot spots.

In an example, the manual indication that the monitored infra-red image comprises one or more anomalous hot spots comprises a manual indication of one or more locations in the monitored infra-red image of the one or more anomalous hot spots.

In a second aspect, there is provided a system for monitoring a switchgear, the system comprising:
an infra-red camera; and
an apparatus for monitoring a switchgear according to the first aspect.

The infra-red camera is configured to acquire the monitored infra-red image of the switchgear.

The above aspects and examples will become apparent from and be elucidated with reference to the embodiments described hereinafter.

The apparatus and system enables temperature hot spots in switchgear, for example in circuit breakers, and in other electrical equipment to be detected through identifying hot spots in infra-red imagery of this equipment. This is achieved through utilization of a machine learning algorithm that has been trained on imagery, at least some of which is synthetically generated in order that the training set can be significant enough for the machine learning algorithm to be able to identify hot spots in different equipment types, from different vantage points and in different situations. Thus, synthetically created infra-red images of components or sub-systems of electrical assets with several variants are used with a machine learning approach to detect hot spots, without having to use infra-red imagery or infra-red cameras, or at least lessen the need to use such imagery and cameras, to develop the machine learning classifier that can identify and locate hot spots on the basis of infra-red imagery.

Thus, this is achieved by apparatus that comprises an input unit, a processing unit, and an output unit. The input unit is configured to provide the processing unit with a monitored infra-red image of a switchgear. The processing unit is configured to implement a machine learning classifier algorithm to analyse the monitored infra-red image and determine if there is one or more anomalous hot spots in the switchgear. The machine learning classifier algorithm has been trained on the basis of a plurality of different training images. The plurality of training images comprises a plurality of synthetic infra-red images generated by an image processing algorithm. The output unit is configured to output information relating to the one or more anomalous hot spots.

According to an example, the image processing algorithm is a Conditional Adversarial Network.

According to an example, the plurality of synthetic infra-red images were generated on the basis of at least one computer aided design drawing, drawing, or sketch of a switchgear.

According to an example, the at least one computer aided design drawing, drawing, or sketch comprises a plurality of drawings comprising drawing data of a plurality of different switchgear.

According to an example, the at least one computer aided design drawing, drawing, or sketch comprises drawing data of at least one circuit breaker.

According to an example, the at least one computer aided design drawing, drawing, or sketch comprises a plurality of drawings comprising drawing data of a plurality of circuit breakers having different internal structures.

According to an example, two or more of the plurality of synthetic infra-red images were generated on the basis of one computer aided design drawing, drawing, or sketch of a switchgear.

According to an example, the plurality of synthetic infra-red images were generated on the basis of a corresponding number of computer aided design drawings, drawings, or sketches of a switchgear.

According to an example, generation of one or more synthetic infra-red images of the plurality of synthetic infra-red images comprises an addition of at least one hot spot to the one or more synthetic infra-red images.

According to an example, generation of one or more synthetic infra-red images of the plurality of synthetic infra-red images comprises an addition of at least one hot spot to the one or more computer aided design drawing, drawing, or sketch of a switchgear.

According to an example, addition of the at least one hot spot is carried out manually.

According to an example, the at least one computer aided design drawing, drawing, or sketch of a switchgear comprises drawing data of at least one circuit breaker.

According to an example, the image processing algorithm utilizes a style transfer algorithm.

According to an example, the image processing algorithm utilizes a pix2pix algorithm.

According to an example, the monitored infra-red image comprises image data of at least one circuit breaker.

According to an example, the machine learning classifier algorithm is a neural network.

According to an example, the neural network is a convolutional neural network.

According to an example, the processing unit is configured to update the training of the machine learning classifier algorithm comprising utilisation of the monitored infra-red image.

According to an example, the training update comprises a manual indication that the monitored infra-red image comprises no anomalous hot spots or a manual indication that the monitored infra-red image comprises one or more anomalous hot spots.

According to an example, the manual indication that the monitored infra-red image comprises one or more anomalous hot spots comprises a manual indication of one or more locations in the monitored infra-red image of the one or more anomalous hot spots.

Thus, as user indicates where in that image there are one or more anomalous hot spots.

As discussed above, the apparatus can be part of a system that has a camera that acquires the monitored infra-red image and provides this to the processing unit, via the input unit.

The apparatus and system are explained in more detail with reference to a circuit breaker in a switchgear, but this is just one example and the apparatus and system find utility to other parts of switchgear and many other types of electrical equipment, where hot spots can occur and be problematic.

Thus, it is convenient to set the scene. There is currently a strong interest in using infrared data to assess a circuit breaker's health state, where hot spots are indicative of a problem and these hotspots are easy for a human to identify and interpret. However, using skilled technicians and engineers in this manner is very expensive. Machine learning algorithms are here utilised to achieve this without a human. However, machine learning algorithms require an extensive training dataset of relevant data, and this is difficult and expensive to provide. The apparatus and system described here addresses this situation.

Thus, the described apparatus and system provides a way to analyze an infra-red image as a whole without regard to camera angle or circuit breaker configuration. It specifically takes into account the fact that there are different circuit breaker geometries. For this purpose a machine learning algorithm (e.g. a convolutional neural network) is used. The network is trained with artificial data produced by a Conditional Adversarial Network on the basis of drawings of switchgear including circuit breakers and other electrical components. As a result, the expensive human intervention of either calibration or region definition is eliminated from the process.

Thus, the structural health of the components in electrical systems, such as circuit breakers, can be detected through hotspots created in the component. Infra-red cameras focusing on such components capture thermal variations to detect the hotspots. Using a neural network classifier algorithm to automate this process requires that it be trained with properly labelled images, and large numbers of such training images with and without problems are required to detect automatically such hotspots. There are several variants of circuit breakers, and the internal structure are very different and using data-driven approaches such as machine learning will therefore be challenging, as the quantity of relevant images do not exist in large numbers and obtaining such imagery requires long waiting periods to obtain them for various circuit breakers, for example when hot spots occur. Current practice is that a manual inspection of the thermal images is carried out by domain experts from time to time to detect any damages in the components and this might be detrimental if the elapsed monitoring period is large enough to have a damage happened in the meantime.

The apparatus and system described here address these issues. This in essence is achieved by using a conditional adversarial network to perform the following:

(1) generate the infra-red images required for training synthetically from CAD or sketches of different types of circuit breakers, which have different internal structures;

(2) generate individual pre-trained machine learning models from (1) for the different circuit breakers so that they can be used to detect hotspots if they exist (or generate one pre-trained machine learning model for the different circuit breakers, with sufficient robustness to deal with differences between circuit breakers), and thus monitoring of switchgear and circuit breakers can commence from the day of installation.

In other words, the apparatus and system enables the pre-trained models to be applied from day one of installation with potentially acceptable accuracy, that can be improved over time as more training data is provided. Several variants of equipment such as switchgear and associated circuit breakers exist, which are structurally different and long periods of observations and several installations of IR cameras would otherwise be needed to create samples to build reliable data-driven models to detect hotspots. This would take a long period of time before the model can be used in practice to detect any hotspots. However, by creating or generating the relevant date for classifier training the apparatus and system addresses two issues related to data acquisition for asset management. The first issue is the lack of infra-red data for equipment with several variants of mechanical structure to train models, and the second issue is the lack of a systematic and agile method using these infra-red images to automatically detect hotspots instead of a manual analysis, or provide a semi-automatic detection mechanism where a human operator is provided with an awareness that further investigation is warranted.

The technical outcome of this solution allows maintenance and service engineers to get an indication of any abnormalities in the variants of circuit breakers by the detection mechanism based on machine learning models and reduces the long waiting periods to acquire data (infra-red images) during abnormal conditions.

Continuing with the situation prior to development of the described apparatus and system, some existing solutions require a very precise calibration of the sensor to look at the right spot. This means that engineering cost is high. A solution that covers a larger area still requires a human to identify the right regions to look at.

Regarding any generic solution that does not require identification of the right areas (e.g. based on a convolutional neural network), this needs to be robust against the differences in circuit breaker geometry and function to be useful. However, if the training network has never experienced certain situations, it is less likely to classify them correctly. A conventional solution for the last point would be to use lots of training data from different breakers. Like a human, the Neural Network learns from experience and is better at judging situations identical or similar to what it has seen before. One way of addressing this is to use lots of training data from different circuit breakers. However, this is costly and takes time.

Thus, the surprising solution utilised in the apparatus and system described here involves the acquisition of additional data that is the synthetic generation of realistic data, but based on drawings. With this additional data, the neural network is able to handle a wider range of situations.

The surprising solution uses a Conditional Adversarial Network, such as the pix2pix algorithm, that can turn a sketch into a photograph. Thus, in the present situation the Conditional Adversarial Network transforms a CAD or Sketch of an internal part of a circuit breaker, for example, to an equivalent infra-red Image Style Transfer Element. Thus, CAD diagrams or sketches of various circuit breakers with areas marked that could potentially experience hot spots (made with the help of domain experts) are provided and these are converted into synthetic infra-red images containing thermal variation features using the Conditional Adversarial Network. This is represented in FIG. 1.

Then a classification model generator is utilized This element gets the images generated by the previous element "CAD to IR style transfer element" and is trained to generate a machine learning classification model for each variant of the circuit breaker. This pre-trained model can then identify structural damages. The machine learning model that corresponds to a circuit breaker variant can detect and provide a technical result whether the breaker is undergoing any structural damage or not by classifying the infra-red image that is generated in the field.

Figure 2:
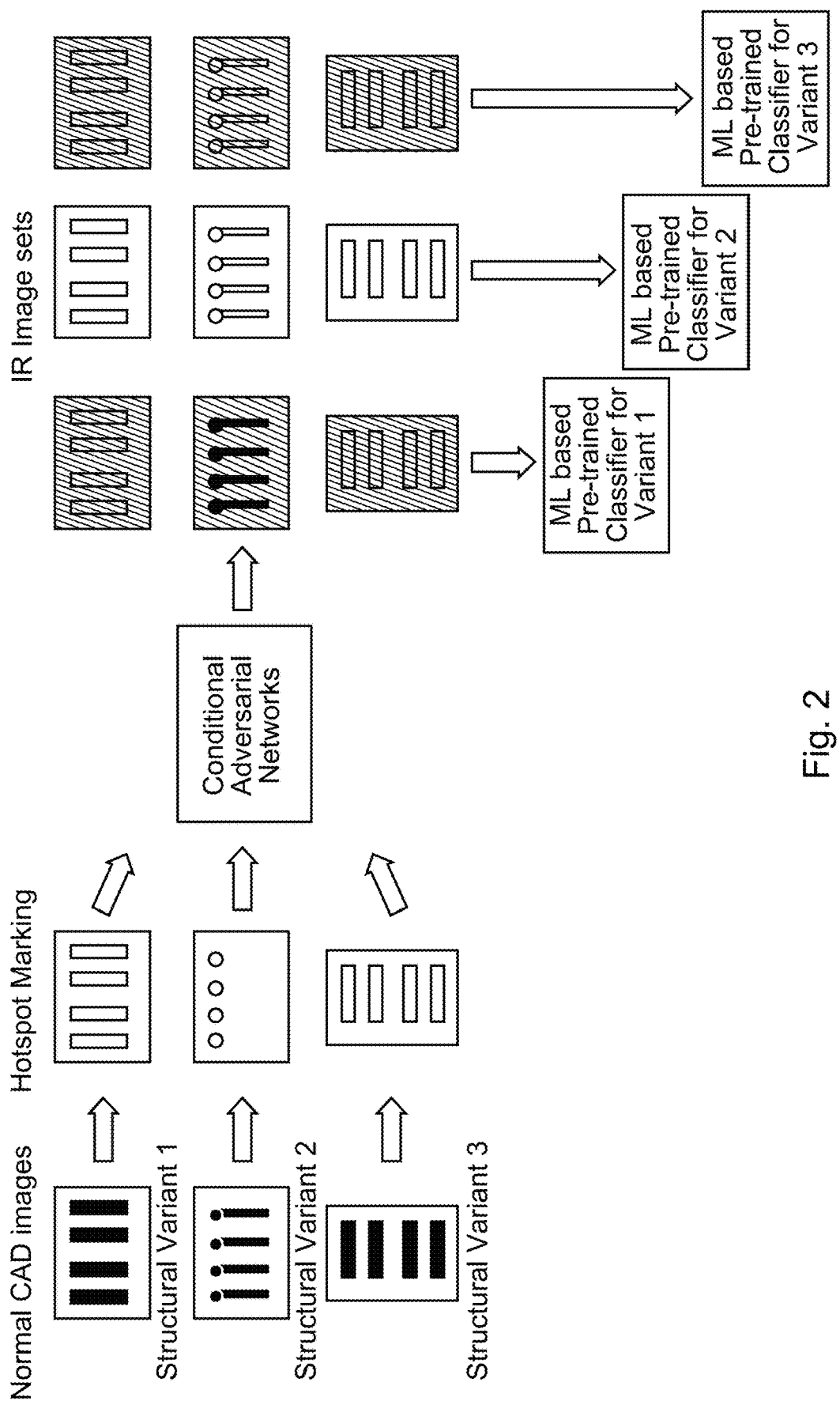
FIG. 2 shows an example of the process flow for generating synthetic images.

FIG. 2 shows a schematic diagram of the process flow used in enabling the solution. Normal CAD images of several variants of the circuit breaker are stored in a database and are first presented to domain experts, who mark where hotspots could occur using a template. Then, based on the inputs from the domain experts and the conditional adversarial network, several synthetic infra-red images with variations are created for each of the circuit breaker variants. The synthetic infra-red images are then given to a suitable classifier (machine learning model) along with other synthetic infra-red images containing no hotspots to train a classifier to prepare a pre-trained model. The pre-trained model is then used to identify and detect hot spots in the respective circuit breaker taking the current infra-red monitoring image from the camera.

Thus, in summary the apparatus and system enables:
1. Template for hotspot marking: The apparatus/system contains the feature that enables the domain expert to mark components that can potentially have hotspots
2. Automated generation of IR image from CAD or sketches: The apparatus/system can generate automatically infra-red images from CAD drawings or sketches using conditional adversarial networks.
3. Pre-trained model generation: The apparatus/system can generate respective pre-trained models based on the synthetically generated infra-red images for variants of circuit breakers to classify automatically images given as input from a live system with infra-red cameras to detect hotspots.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for monitoring a switchgear, the apparatus comprising:
  a processor, wherein the processor is configured to:
    obtain a monitored infra-red image of the switchgear,
    implement a machine learning classifier algorithm to analyze the monitored infra-red image and determine if there is one or more anomalous hot spots in the switchgear,
    wherein the machine learning classifier algorithm has been trained based on a plurality of different training images comprising a plurality of synthetic infra-red images, wherein the plurality of synthetic infra-red images are directly output from an image processing algorithm by directly inputting at least one marked-up image of the switchgear into the image processing algorithm,
    wherein the at least one marked-up image of the switchgear indicates a marking associated with at least one hotspot that is added based on user input from a user; and
    output information relating to the one or more anomalous hot spots.

2. The apparatus of claim 1, wherein the image processing algorithm comprises a Conditional Adversarial Network.

3. The apparatus of claim 1, wherein the at least one marked-up image comprises at least one computer aided design drawing, drawing, or sketch of the switchgear.

4. The apparatus of claim 3, wherein the at least one computer aided design drawing, drawing, or sketch comprises a plurality of drawings comprising drawing data of a plurality of different switchgears.

5. The apparatus of claim 3, wherein the at least one computer aided design drawing, drawing, or sketch comprises drawing data of at least one circuit breaker.

6. The apparatus of claim 5, wherein the at least one computer aided design drawing, drawing, or sketch comprises a plurality of drawings comprising drawing data of a plurality of circuit breakers having different internal structures.

7. The apparatus of claim 3, wherein two or more of the plurality of synthetic infra-red images are directly output from the image processing algorithm by directly inputting one computer aided design drawing, drawing, or sketch of the switchgear.

8. The apparatus of claim 3, wherein the plurality of synthetic infra-red images are directly output from the image processing algorithm by directly inputting a corresponding number of computer aided design drawings, drawings, or sketches of the switchgear.

9. The apparatus of claim 3, wherein generation of one or more synthetic infra-red images of the plurality of synthetic infra-red images comprises an addition of at least one hot spot to the one or more synthetic infra-red images.

10. The apparatus of claim 3, wherein the marking is an addition of the at least one hot spot to the at least one computer aided design drawing, drawing, or sketch of the switchgear.

11. The apparatus of claim 3, wherein the at least one computer aided design drawing, drawing, or sketch of the switchgear comprises drawing data of at least one circuit breaker.

12. The apparatus of claim 1, wherein the image processing algorithm utilizes a style transfer algorithm.

13. The apparatus of claim 12, wherein the image processing algorithm utilizes a pix2pix algorithm.

14. The apparatus of claim 1, wherein the monitored infra-red image comprises image data of at least one circuit breaker.

15. The apparatus of claim 1, wherein the machine learning classifier algorithm comprises a neural network.

16. The apparatus of claim 15, wherein the neural network comprises a convolutional neural network.

17. The apparatus of claim 16, wherein the processor is configured to update a training of the machine learning classifier algorithm comprising utilization of the monitored infra-red image as a training update.

18. The apparatus of claim 17, wherein the training update comprises a manual indication that the monitored infra-red image comprises no anomalous hot spots or a manual indication that the monitored infra-red image comprises one or more anomalous hot spots.

19. The apparatus of claim 18, wherein the manual indication that the monitored infra-red image comprises one or more anomalous hot spots comprises a manual indication of one or more locations in the monitored infra-red image of the one or more anomalous hot spots.

20. A system for monitoring a switchgear, the system comprising:
   an infra-red camera; and
   the apparatus of claim 1,
   wherein the infra-red camera is configured to acquire the monitored infra-red image of the switchgear.

21. A method for monitoring a switchgear, the method comprising:
   obtaining a monitored infra-red image of the switchgear,
   implementing a machine learning classifier algorithm to analyze the monitored infra-red image and determine if there is one or more anomalous hot spots in the switchgear,
   wherein the machine learning classifier algorithm has been trained based on a plurality of different training images comprising a plurality of synthetic infra-red images, wherein the plurality of synthetic infra-red images are directly output from an image processing algorithm by directly inputting at least one marked-up image of the switchgear into the image processing algorithm, and
   wherein the at least one marked-up image of the switchgear indicates a marking associated with at least one hotspot that is added based on user input from a user; and
   outputting information relating to the one or more anomalous hot spots.

* * * * *